United States Patent [19]

Gutknecht

[11] Patent Number: 4,599,002

[45] Date of Patent: Jul. 8, 1986

[54] SCREW EXTRUDER FOR REDUCING THE VOLUME OF MATERIALS

[76] Inventor: Max Gutknecht, Mühlenstrasse 141, Ellikon an der Thur, Switzerland

[21] Appl. No.: 573,932

[22] Filed: Jan. 4, 1984

[30] Foreign Application Priority Data

May 17, 1982 [CH] Switzerland ........................ 3062/82

[51] Int. Cl.[4] ........................... B29B 7/18; B29B 7/20

[52] U.S. Cl. ................................. 366/85; 264/176 R; 425/131.1; 425/381; 425/204; 366/76

[58] Field of Search ............... 425/203, 205, 381, 466, 425/131.1, 204, 208, 190; 366/75, 77, 83, 84, 85, 87, 88, 90, 322, 76; 264/176 R, 349

[56] References Cited

U.S. PATENT DOCUMENTS 3,327,346 6/1967 Blomet et al. ........................ 425/381
4,107,787 8/1978 Ocker .................................... 366/84
4,178,104 12/1979 Menges et al. ......................... 366/90
4,185,057 1/1980 Rossiter et al. ...................... 425/146
4,395,427 7/1983 Fischer et al. ....................... 425/466

*Primary Examiner*—Jay H. Woo
*Assistant Examiner*—Timothy W. Heitbrink
*Attorney, Agent, or Firm*—Weingarten, Schurgin, Gagnebin & Hayes

[57] ABSTRACT

The screw extruder has a casing (2–6) formed from several casing members (1) and in it are mounted screws (14) formed from screw members (10, 11). Between the casing members (3–6) are arranged orifice plates (19), which block the passage of the screws (10) with the exception of a restricted gap. A gear (26) is provided for driving the screw (10, 11). The screw shafts (12, 13) extend through the gear (26) and are supported on a thrust bearing, fixed by means of tie rods (25) to the casing (1). As a result of this construction, the screw press can be used for processing widely differing materials, without any significant modifications. Any liquid is removed by suction and the resulting solids are dried and can be briquetted by a shaping head.

8 Claims, 4 Drawing Figures

SCREW EXTRUDER FOR REDUCING THE VOLUME OF MATERIALS

BACKGROUND OF THE INVENTION

The invention relates to a process for reducing the volume of materials by compression in a screw extruder and to a screw extruder for performing this process.

Numerous different screw extruder constructions are known. They are mainly used in the plastic processing industry and with the aid thereof it is possible to produce semifinished plastic articles, as well as finished plastic articles of the most varied types. It is known that during the processing of many plastics, the screw extruders and in particular the screw must be constructed in accordance with the material to be processed, which leads to a large number of different extruder constructions. Consequently, there is an equally large number of screw extruder manufacturers.

The number of screw extruder types would be further increased if it were necessary to use a screw extruder for processing further organic or inorganic materials, other than plastics. In addition, screw extruders are relatively complicated machines, which can really only be operated by trained personnel. Thus, difficulties may occur when such screw extruders are, for example, used in developing countries.

In the field of waste processing, it is ever more pressing in view of the harm to the environment, to use processes and plants enabling waste materials to be processed with a low expenditure of energy and enabling them to be brought into a form in which they can be reused or more easily destroyed, e.g. incinerated.

Thus, the problem of the invention is to so develop a process and a screw extruder for processing materials, that the same process steps can be used for processing a large number of different materials and consequently the extruder can be constructed in such a way that there is no need for modifications to the basic construction, even when processing widely differing materials. These materials cover flowable and free-flowing mixtures of preferably organic substances, waste materials and mixtures of the most varied types, e.g. sewage sludge, manure, refuse or garbage, etc. It also covers inorganic mixtures, e.g. chemical waste, which must be processed in such a way that they are made harmless or can easily be destroyed.

BACKGROUND OF THE INVENTION

According to the invention, this problem is solved in that the compressing process is performed in stepwise manner, the material undergoing a constricting action after each treatment stage.

The screw extruder for performing the process according to the invention has its casing subdivided into casing members, between which is positioned an orifice plate, which blocks the free cross-section of the screws, accompanied by the formation of a through-gap on the core periphery of the screws.

BRIEF DESCRIPTION OF THE DRAWINGS

The invention is described in greater detail hereinafter relative to non-limitative embodiments and the attached drawings, wherein is shown.

DETAILED DESCRIPTION OF THE PREFERRED EMBODIMENTS

Figure 1:
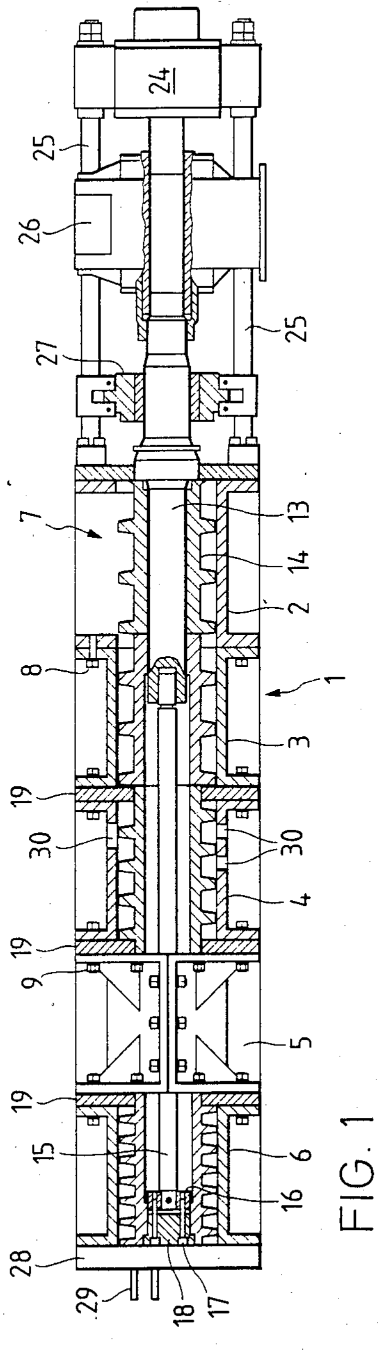
FIG. 1 a side view of a screw extruder according to the invention.
Figure 2:
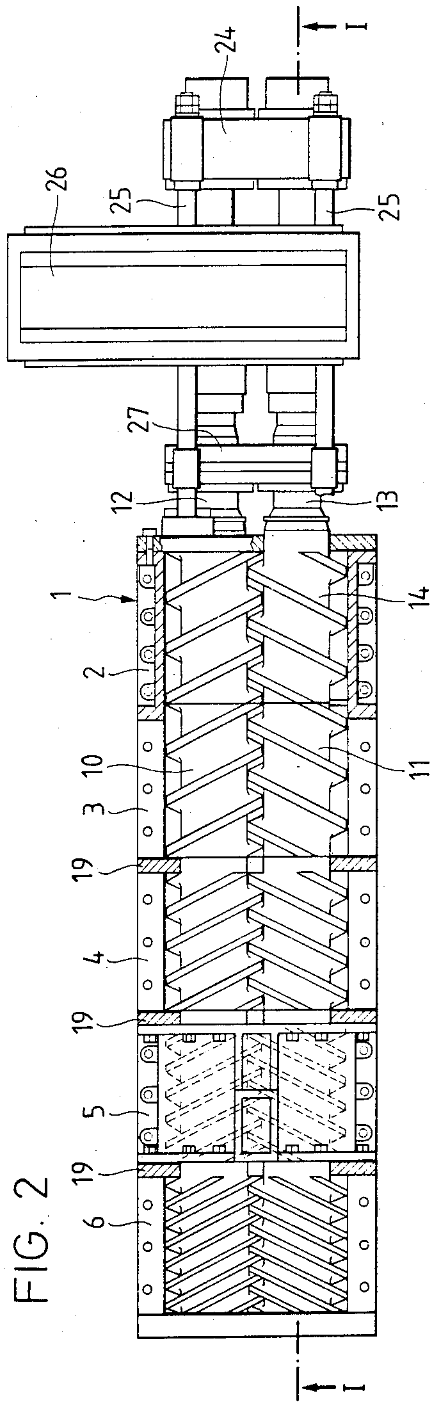
FIG. 2 partly in section, a plan view of the screw extruder of FIG. 1.

The double screw extruder of FIGS. 1 and 2 has a casing, formed by casing members 2, 3, 4, 5, 6, casing member 2 differing from the other casing members 3 to 6 and has a charging opening 7. Casing members 2 to 6 are joined together by screws 8 or bolts 9.

Within casing 1 are located two screws 10, 11, formed from a plurality of parts, of FIG. 1. Screw members 14, whose length corresponds to that of casing members 2 to 6, are mounted on a screw shaft 12, 13. They can have a single or multiple thread and can have the same or a different pitch. The sequence and number of screw members 14 can be adapted to the material to be processed. A tension shaft 15 is screwed onto the face of screw shafts 12, 13 and extends through screw member 14 up to the end of the final screw member and at its end carries a spring flange 16, into which are screwed locking screws 17, which are mounted in a grip 18 supported in the final screw member 14 and by turning permit the locking of shaft 15 and consequently screw members 14.

Figure 3:
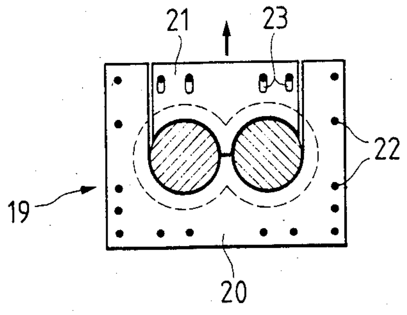
FIG. 3 a view of an orifice disk placed in the screw extruder of FIGS. 1 and 2.

Between the individual casing members 3 to 6 is provided an orifice plate, whose construction is shown in FIG. 3. Orifice plate 19, leading to the formation of a narrow gap round the core diameter of screw members 14, comprises two parts 20, 21, which have corresponding bores 22 or slots 23, with the aid of which they are held by bolts 9 between casing members 3 to 6. The slots 23 in the top part 21 permit a varying setting of the gap between perforated plate 19 and the core diameter of screw member 14. Perforated plate 19 makes it possible to process the most varied materials with the same screw extruder. Casing members 3 to 6, which e.g. in FIGS. 1 and 2 are in two-part form, and members 14 do not have to be modified. Adaptation to the most varied materials can take place in simple manner in that casing 1 correspondingly with screws 10, 11 are modified by adding or removing further casing and screw members.

On the intake side, the two screw shafts 12, 13 project out of casing 1 and extend through toothed gearing and are supported on a thrust bearing 24. Supporting can be brought about in various ways, e.g. by thrust roller bearings. It is important that the force exerted by the two screw shafts 12, 13 on thrust bearing 24 is diverted to casing 1 by means of tie rods 25, fixed in casing 1 and as a result a closed flux of force is obtained. Gear 26, preferably a toothed gear, is used for coupling a driving motor and by means of gear 26 the two screw shafts 12, 13 are driven.

A spreading or expanding pressure receiver is provided between casing 1 and gear 26, so that the screw shafts 12, 13 passing through this receiver are mounted by means of bearings. If spreading or expanding forces occur on screw shafts 12, 13, the latter are supported by means of their bearings on receiver 27, which is loosely guided on tie rods 25 and is not supported on casing 1 or gear 26. A shaping or briquetting head 28 is fixed to the outlet side of the screw extruder. The material leaving the screw extruder can consequently be given a specific shape. Guides 29 are used for leading off the expelled material.

One or more openings 30 can be provided at the top and/or bottom of casing members 3 to 6 and at these any juice or vapour collecting or flowing out during the compression process can be removed by suction and led to a further treatment stage. It is possible for juice to be squeezed out from the openings located close to charging opening 7 and for vapour to be removed by suction from the more remote openings. Here again, the screw extruder can be adapted to requirements, without any significant changes.

Figure 4:
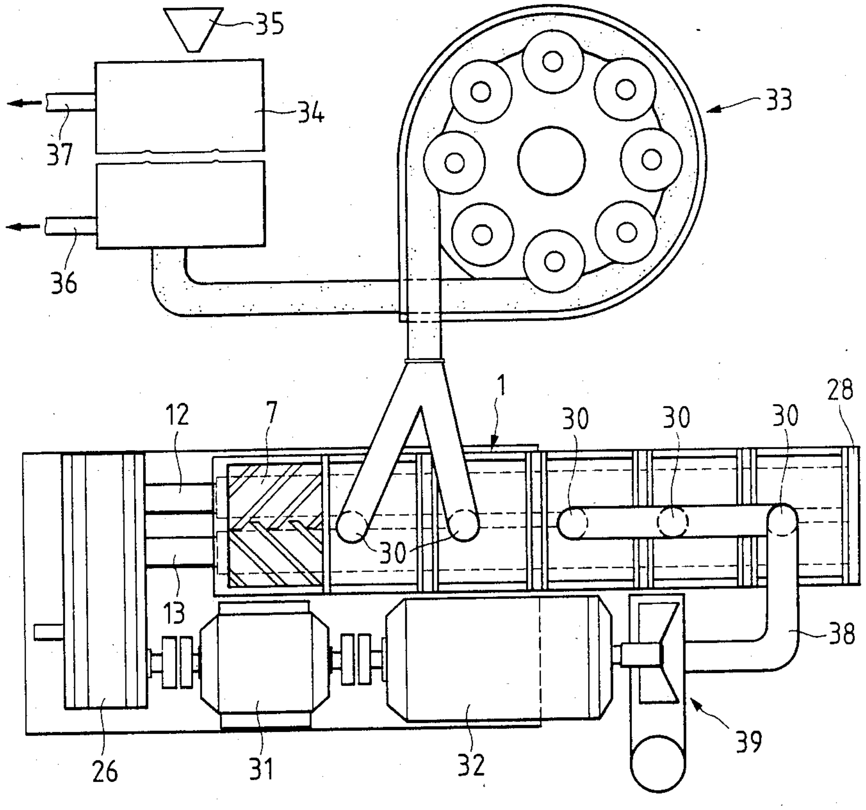
FIG. 4 a diagrammatic view of the use of the screw extruder of FIGS. 1 and 2 in the processing of a green mass, e.g. grass.

FIG. 4 diagrammatically shows a plant for processing green mass, e.g. grass. The screw shafts 12, 13 of the screw extruder are driven by a motor 31, via a gear 26 and which is coupled to a second motor 32. A hose pump 33 sucks up the juice squeezed out of the green mass from the first two openings 30 and feeds it to a flocculation container 34. The flocculating agent is added thereto by means of a diagrammatically represented device 35. The gel formed is led off by a line 36 and the residual liquor by a line 37. The hose pump 33 can be constructed in accordance with the construction described in the patent application of the same inventor filed at the same time as the present application (CH 3063/82 of 15.5.82), whilst the complete plant of FIG. 4 operates according to the process of a simultaneously filed patent application (CH 3061/82 of 17.5.82). The other two openings 31 are used for the removal of vapours by suction through a fan 39 or a vacuum pump via a line 38.

Thus, this screw extruder solves the problem of drying and simitaneously briquetting materials. Liquids and vapours produced can be easily removed by suction and separately processed. It is important that the extruder is made from standardized members i.e. casing members 2 to 6 and screw members 14, whilst the corresponding number of standard orifice plates 19 can be used. It has surprisingly been found during the operation of such an extruder that the power required is relatively low, so that compared with other drying processes, less power is required, whilst a large number of functions can be carried out by the present process and extruder. Particular significance is attached to mechanical drying, i.e. without any heat supply, and the resulting hygienization, i.e. substantial sterility and the resulting storage stability of the end product. The adaptation of the screw extruder to the different materials of widely varying composition to be processed can be achieved in a rapid and problem-free manner by the number and arrangement of the screw members 14, e.g. with opposite pitch and, in the case of two screws 10, 11, by the operating mode, e.g. with opposite rotation directions at the top and bottom, as well as with counterclockwise or clockwise rotation of both screws. The material of the screw members 14 is appropriately abrasion-proof, e.g. high-alloyed steel, whilst the parts subject to the greatest wear can be tipped with hard metal.

What is claimed is:

1. A screw extruder for compressing a material to be compressed, comprising:

plural contiguous screw extruder units arranged in a line each of said units having a casing member defining an inlet and an outlet, an elongated screw member disposed in each of said casing members and extending between the inlet and outlet of said casing members said screw members having a core defining a first circumferential dimension and a thread wrapped about the core defining a second circumferential dimension larger than the first circumferential dimension, the first and second circumferential dimensions defining a screw member free-section, and each of said units including a throttle plate member disposed in each of said casing members proximate the inlet of said casing members the direction of elongation of the screw members said throttle plate member and having an orifice therethrough having a preselected dimension selected to be greater than said first circumferential dimension but less than said second circumferential dimension so as to effectively block the free-section of the screw members;

whereby, material to be compressed sequentially introduced through each of said contiguous screw extruder units are pressed against said throttle plate member of a corresponding screw extruder unit with a large force thereby causing heat that creates pulverization and drying of the material by friction on each of said throttle plate members before passing through the corresponding orifices of said throttle plate members having said preselected dimension that effectively blocks the free-section of the corresponding screw members.

2. The invention of claim 1, wherein said screw members each include two laterally spaced screw member portions each having a core member defining a first circumferential dimension and a thread wrapped about the core defining a second circumferential dimension, and said throttle plate member of each of said corresponding screw extruder units having an orifice therethrough of preselected dimensions selected to be greater than twice said first circumferential dimensions but less than twice said second circumferential dimensions so as to effectively impede the free-section of the two screw member portions combined.

3. The invention of claim 2, wherein each of said throttle plate members having an orifice includes first and second plate member portions having confronting cut-outs that are cooperative to provide said orifice, and further including means for moving said first and said second plate member portions relative to each other such that said confronting cut-outs thereof define an orifice of selectably different dimensions.

4. The invention of claim 2, wherein said moving means includes means for sliding said first and said second plate member portions of each of said throttle plate members adjustably to different selected positions spaced in the plane of said first and said second plate member portions.

5. The invention of claim 1, further including a rotatable shaft, and means coupled to the plural contiguous screw extruder units for mounting said plural screw members for rotation with said rotatable shaft.

6. The invention of claim 5, wherein one of said plural contiguous screw extruder units is an intake unit and another one thereof is a final unit, and wherein said rotating mounting means includes a tension shaft mounted between the screw member of said final unit and the screw member of said intake unit.

7. The invention of claim 5, further including a gear mounted to said shaft for rotating said shaft, and a thrust bearing coupled to said gear via tie rods.

8. The invention of claim 7, further including means coupled to said shaft for preventing lateral motion thereof.

* * * * *

UNITED STATES PATENT AND TRADEMARK OFFICE

CERTIFICATE OF CORRECTION

PATENT NO. : 4,599,002

DATED : July 8, 1986

INVENTOR(S) : Max Gutknecht

It is certified that error appears in the above-identified patent and that said Letters Patent is hereby corrected as shown below:

Column 1, line 50, "BACKGROUND OF THE INVENTION" should read --SUMMARY OF THE INVENTION--.

Column 3, line 33, "simitaneously" should read --simultaneously--

Signed and Sealed this

Seventeenth Day of May, 1988

*Attest:*

DONALD J. QUIGG

*Attesting Officer*

*Commissioner of Patents and Trademarks*